United States Patent
Bianco et al.

(10) Patent No.: US 8,789,195 B2
(45) Date of Patent: Jul. 22, 2014

(54) METHOD AND SYSTEM FOR ACCESS CONTROL AND DATA PROTECTION IN DIGITAL MEMORIES, RELATED DIGITAL MEMORY AND COMPUTER PROGRAM PRODUCT THEREFOR

(75) Inventors: Alberto Bianco, Turin (IT); Laura Colazzo, Turin (IT); Fabio Ricciato, Turin (IT); Maura Turolla, Turin (IT); Antonio Varriale, Turin (IT)

(73) Assignee: Telecom Italia S.p.A., Milan (IT)

( * ) Notice: Subject to any disclaimer, the term of this patent is extended or adjusted under 35 U.S.C. 154(b) by 1722 days.

(21) Appl. No.: 11/793,239

(22) PCT Filed: Dec. 22, 2004

(86) PCT No.: PCT/EP2004/014611
§ 371 (c)(1),
(2), (4) Date: Jun. 29, 2007

(87) PCT Pub. No.: WO2006/066604
PCT Pub. Date: Jun. 29, 2006

(65) Prior Publication Data
US 2008/0089517 A1   Apr. 17, 2008

(51) Int. Cl.
*G06F 21/00* (2013.01)

(52) U.S. Cl.
USPC .............................................. 726/26; 726/28

(58) Field of Classification Search
USPC .......................................................... 726/28
See application file for complete search history.

(56) References Cited

U.S. PATENT DOCUMENTS

| 5,379,344 | A  | 1/1995  | Larsson et al. |
| 5,991,858 | A  | 11/1999 | Weinlander |
| 6,094,724 | A  | 7/2000  | Benhammou et al. |
| 6,178,508 | B1 | 1/2001  | Kaufman |
| 6,397,333 | B1 | 5/2002  | Sohne et al. |

(Continued)

FOREIGN PATENT DOCUMENTS

| EP | 0 596 276 B1  | 5/1994 |
| EP | 0 867 843 B1  | 1/2004 |
| EP | 1 467 312 A1  | 10/2004 |
| WO | WO 01/29791 A1 | 4/2001 |

OTHER PUBLICATIONS

A. Nash, "PKI. Implementing and Managing E-Security," Public Key Infrastructure Basics, Osborne/McGraw-Hill, Chapter 3, pp. 63-94, (2001).

*Primary Examiner* — Edward Zee
*Assistant Examiner* — Chi Nguy
(74) *Attorney, Agent, or Firm* — Finnegan, Henderson, Farabow, Garrett & Dunner, L.L.P.

(57) ABSTRACT

A digital memory such as a memory card for mobile communication equipment, is adapted to be accessed by a plurality of users and have protected data stored therein. The memory is dynamically partitionable in private memory areas for storing data therein and has associated therewith a secrecy tool for securely allocating to the users respective private areas and permitting the users to access the respective private areas via a secure session channel to perform read/write commands in the respective private areas. Typically, the memory/card includes: a card interface controller for managing a physical communication layer between the digital memory and external host equipment, an internal memory having associated therewith a hardware lock to control access to the internal memory, a set of cryptographic modules to manage the secure session channel between the users and the digital memory, and a memory certificate for certifying a public key associated with the digital memory.

24 Claims, 8 Drawing Sheets

(56) References Cited

U.S. PATENT DOCUMENTS

| | | |
|---|---|---|
| 7,181,017 B1 * | 2/2007 | Nagel et al. .................. 380/282 |
| 2002/0078346 A1 | 6/2002 | Sandhu et al. |
| 2003/0154485 A1 | 8/2003 | Johnson et al. |
| 2004/0003277 A1 * | 1/2004 | Rabeler ........................ 713/200 |
| 2004/0059925 A1 | 3/2004 | Benhammou et al. |
| 2004/0139021 A1 | 7/2004 | Reed et al. |
| 2004/0172369 A1 | 9/2004 | Persson |
| 2007/0028292 A1 * | 2/2007 | Kabzinski et al. ................ 726/2 |

* cited by examiner

FIG. 6 a) | 0xA0 | 0x01 | -- | -- | Lc | USR Certificate | Le | b) | 0x90 | 0x00 | Session ID | CARD Certificate |

FIG. 7 a) | 0xA0 | 0x02 | -- | -- | Lc | Session ID | $A(K_{PUB,CARD}; RND1)$ | Le | b) | 0x90 | 0x00 | Session ID | $A(K_{PUB,CARD}; RND2)$ |

FIG. 8 a) | 0xA0 | 0x03 | -- | -- | Lc | Session ID | $HMAC(K_{SESS}; CMD)$ | Le | b) | 0x90 | 0x00 | Session ID |

*FIG. 9*

FIG. 10 a) | 0xA0 | 0x04 | - | - | Lc | Sess ID | ADDR | LEN | HMAC($K_{SESS}$;CMD) | Le | b) | 0x90 | 0x00 | Session ID | S($K_{SESS}$; DATA) |

FIG. 11 a) | 0xA0 | 0x05 | - | - | Lc | Sess ID | ADDR | LEN | S($K_{SESS}$; DATA) | HMAC($K_{SESS}$;CMD) | Le | b) | 0x90 | 0x00 | Session ID |

FIG. 12 a) | 0xA0 | 0x06 | - | - | Lc | S(SuperUser old PIN; newPIN) | HMAC(SuperUser old PIN; CMD) | Le | b) | 0x90 | 0x00 | a) | 0xA0 | 0x07 | -- | Lc | Le | b) | 0x90 | 0x00 | N | UsrID,1 | UsrName,1 | UserBlkNum,1 | - | UsrID,N | ... | UserBlkNum,N |

FIG. 13 a) | 0xA0 | 0x08 | -- | Lc | Usr ID | HMAC(SuperUserPIN, CMD) | Le | b) | 0x90 | 0x00 | UserID |

FIG. 14 a) | 0xA0 | 0x09 | -- | Lc | SessID | Blks# | Name | HMAC($K_{SESS}$;CMD) | Le | b) | 0x90 | 0x00 | UserID | StartBlk |

FIG. 15 a) | 0xA0 | 0x09 | 0x02 | -- | Lc | SessID | Starting Blk | HMAC($K_{SESS}$;CMD) | Le | b) | 0x90 | 0x00 | User ID |

METHOD AND SYSTEM FOR ACCESS CONTROL AND DATA PROTECTION IN DIGITAL MEMORIES, RELATED DIGITAL MEMORY AND COMPUTER PROGRAM PRODUCT THEREFOR

CROSS REFERENCE TO RELATED APPLICATION

This application is a national phase application based on PCT/EP2004/014611, filed Dec. 22, 2004, the content of which is incorporated herein by reference.

FIELD OF THE INVENTION

The invention relates to techniques for access control and data protection in digital memories such as e.g. digital memory cards.

The invention was developed by paying specific attention to the possible application to portable devices. However, reference to this specific field of application is in no way to be construed in a limiting sense of the scope of the invention.

DESCRIPTION OF THE RELATED ART

The introduction of new types of digital memory storage and their use in network-based digital audio/video distribution is paralleled by the development of new algorithms and protocols for access control and data protection.

Specifically, the so-called "next generation" portable devices will require an ever-increasing amount of memory space in order to manage several complex multimedia applications and data. Nowadays, removable memory devices, such as multimedia cards and secure digital cards, have been introduced in the portable devices market, and provide a good solution for the mobile applications delivery and management. A secure card architecture and a "bulletproof" communication protocol between the card and the reader are key factors in ensuring protection of the memory contents. Both private users and providers of mobile applications (contents and services) have a common need of at least partly sharing the same memory card. Mechanisms are therefore required that may guarantee the mutual authentication, validation and protection of card access events and contents.

Document U.S. Pat. No. 6,397,333 discloses a copy protection system and method wherein a secure data channel is established between a service provider and a media device. Copyright data are stored in the device after encryption with a device identification key, binding the contents to the specific medium. All the keys are set by the provider and the device in order to permit Digital Rights Management (DRM) i.e. making it impossible to use media containing copied contents.

In U.S. Pat. No. 5,991,858 a multi-user data processing system with storage protection is described. The system is generalized in the form of a processor and a portable chip card memory, and operates without any intervention in the hardware structure of the chip card. The memory on the chip card is subdivided into at least two areas, namely an operating system memory area that contains the code for managing the hardware components, and a user memory area, split up among users. A memory area access table in the operating system area contains, on a per-user basis, the authorized address area for user commands. When a command is loaded, an additional routine is called to check whether each memory cell access lies in the authorized address area. This routine is in the operating system of the processor.

Another technique conceived for multi-user access to a resource, is disclosed in U.S. Pat. No. 6,178,508. In this case, cryptographically hashed passwords, assigned to a plurality of users, guarantee protection and control accesses to the encrypted data file. Specifically, the content is encrypted with a unique key and stored in a file preceded by an unencrypted header. The header includes one entry for each authorized user containing a respective username and hashed password and a table showing some combinations of passwords belonging to a certain number (quorum) of users allowed to access the data, plus the content key X-ORed with the cryptographically hashed passwords. Whenever a user inserts his password, this is cryptographically hashed and then compared with the hashed passwords in the header in order to decide whether the user is allowed to access the protected data. For each password insertion, the system checks whether the quorum is reached. If it is true, it extracts the content key and decrypts the protected data file.

Document U.S. Pat. No. 5,379,344 discloses a validation device for a smart card that is particularly adapted for use when the smart card is used as a cash substitute. This arrangement is based on a kind of smart card having two distinct memory portions: a protected data storage area and an unprotected area, accessible at any time. The access to the protected area is obtained by using an access code. In operation, the validation device first reads a certificate and the card serial number from the unprotected memory; then it encrypts the certificate and the serial number with a secret key stored in a Read Only Memory (ROM) within the device and transmits the result to the smart card as access code. At this point, the validation device is able to read data from the key-protected memory area. This information is encrypted with the secret encryption key and compared with the certificate read before, producing a validation signal. A similar technique is used to update the data and the certificate and to lock the card, generating each time a new user access code.

Document EP-A-0 596 276 discloses a memory card protection technique wherein an Access Control Processor prompts the system user to input a password, a pin or the like in order to access the memory card. All commands are issued without providing any protection on the communication channel.

Turning specifically to memory card technology, a first version of the Multi Media Card (MMC) did not provide for any mechanism for content protection in addition to simply locking the card by means of a user password. No Digital Rights Management (DRM) or multi-user authentication were implemented.

A Multi Media Card version that solves the Digital Rights Management problem, using a mechanism of license exchange and updating, is the so-called SecureMMC (Secure Multi Media Card). No user identification or secure user data storage is provided in a SecureMMC.

The latest version of the Multi Media Card, the PIN-SecureMMC, is able to bind the card content to a final user. The license and user Personal Identification Number (PIN) storage is made by the service provider, in combination with the communication of PIN to final user. In this case, multi-user access and storage of protected user data is not foreseen because users are not in a position to set their Personal Identification Number.

General information on MMC (Multi Media Card), SecureMMC (Secure Multi Media Card), and PIN-SecureMMC can be found at the web site http://mmca.org of MMCA (Multi Media Card Association).

Another kind of memory card that provides secure memorization techniques is the Secure Digital Card (SDCard). General information about this type of memory card can be found at the web site http://www.sdcard.org. In this type of card the memory is physically divided into a user area and a protected area. This card can manage DRM and use an authentication mechanism that allows standard compliant player to access to copyright data stored into the card. To obtain the keys for accessing to the protected data and use the mechanism described into the standard, either player device or user must make a request to a third party association.

OBJECT AND SUMMARY OF THE INVENTION

The object of the present invention is thus to provide an improved technique for access control and data protection in digital memories adapted to overcome the limitations of the previous arrangements considered in the foregoing.

A specific object of the present invention is to provide a means of controlling interactions between two actors in a secure data transmission and storage arrangement, which may allow e.g. users to set security keys by themselves and store their personal data on a memory device in a secure way. Such an improved arrangement should preferably permit the user of a memory card to store therein any information of interest. This while permitting multi-user access management, in order to allow secure memory sharing by different system users, within the framework of a system that is secure against unauthorized use and prevents tampering with the data stored in the memory card. Another requirement to be met is that communication between the user and the memory card is protected, by preventing e.g. possible tapping the communication bus in order to obtain the memory access password.

It will be appreciated that the needs/problems outlined in the foregoing become particularly significant in the case of portable devices, such as a mobile phone/terminal. Contrary to more conventional applications, where digital memories likely to contain sensitive information are typically located in a "trusted" environment for the owner of the information, mobile applications oftentimes require that sensitive information belonging to e.g. a service provider should be stored in a memory (e.g. a card) associated with a mobile phone/terminal. The sensitive information in question thus needs to be stored in a generally "untrusted" environment, remote from and thus out of direct control by the owner of the information.

According to the present invention, those objects are achieved by means of a method having the features set forth in the claims that follow. The invention also relates to a corresponding system, a related digital memory as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

A preferred embodiment of the invention is thus a method of controlling access by a plurality of users to a digital memory and protecting data in said digital memory; the method includes the steps of:

dynamically partitioning said digital memory in private areas for storing data in said digital memory, said private areas being securely allocated to respective users of said plurality, and permitting said users of said plurality to access said respective private areas via a secure session channel to perform read/write commands in said respective area allocated.

In a particularly preferred embodiment of the invention the users in said plurality self-allocate respective private areas in said digital memory.

Preferably, users can be automatically registered on a memory card without external administration systems and entities; at each access, both the user and the memory card authenticate themselves in order to guarantee the security in the physical communication channel.

A particularly preferred embodiment of the invention is a digital memory, such as a memory card, adapted to be accessed by a plurality of users and have protected data stored therein. The memory is dynamically partitionable in private memory areas for storing data therein and has associated a secrecy tool (such as e.g. an encryption engine, a key, and/or a type of a "secret") for securely allocating respective private memory areas (68) to the users and permitting the users to access the respective private areas via a secure session channel to perform read/write commands in the respective private areas.

The arrangement described herein thus renders memory cards able to manage secrets and users accesses. A preferred communication protocol for use within the framework of the invention is based on both symmetric and asymmetric crypto-algorithms. Such a protocol is designed to protect communication from external attacks, such as man-in-the-middle attacks. Preferably, in order to increase the system entropy and generate the session channels, a random number generator block is involved with each session.

In a preferred embodiment from the architectural point of view, memory cards store user keys up a key allocation table block which enables physical access to the internal memory through the memory lock, as detailed in the following; this solution can be easily applied to generic secrets containers.

The arrangement described herein is adapted for use in Digital Rights Management (DRM), and also gives the users the possibility of directly administering their protected data. Each protected data file can be encrypted with a different key even if it belongs to the same user and can be stored anywhere in the memory area.

The arrangement described herein provides a different and more general method not only for protected data storage and retrieval or multi-user file access, but also for specifying the interaction between two or more actors in a secure data transmission and storage. For that purpose the arrangement described herein does not require two distinct memory areas and, in its application, provides a different mechanism for authentication and key exchange. A preferred embodiment of that concept is based on an articulated communication protocol and a memory card architecture that produce temporal (timed out) secure sessions in order to guarantee the protection of all commands and data transfers from/to the memory card. Different users can thus allocate or de-allocate partial secure memory areas at any moment.

When applied to memory cards, such as the Multi Media Card (MMC), the arrangement described herein leads to significant improvement in terms of guaranteeing data protection. The arrangement described herein can be easily adapted to each kind of memory card at the cost of little hardware changes, thus making it possible for a user (this being intended to be not just an individual, but also a service provider or a digital system) to set the keys by himself or herself, interact with the storage media, transfer private data and store them in a secure way.

The arrangement described herein allows the user to allocate a private area on the storage media; after the allocation the user can securely access the storage media. Security is guaranteed not only in the storage media but also on the communication channel; in that way the storage media can be securely used in un-trusted environments, where malicious users can access to the communication channel. Additionally, the storage media can be securely shared by different users. Non-allocated area is public. Each user thus can access it. Moreover, each user can access to its pre-allocated area. Non-allocated area can be accessed as public area of the card. At building time the storage media is just made up of the public area. Usually, the first time the user accesses the card, the user can perform only read and write operations from/to the public area. In that case the user will not use any related secure commands flows, but just common read and write commands. These commands will generally depend on the specific storage media protocol (Multi Media Card, Compact Flash, etc.).

BRIEF DESCRIPTION OF THE ANNEXED DRAWINGS

The invention will now be described, by way of example only, with reference to the enclosed figures of drawing, wherein.

DETAILED DESCRIPTION OF PREFERRED EMBODIMENTS OF THE INVENTION

The following is a description of an exemplary embodiment of a card architecture and communication protocol that allow several users to securely read, write, update and delete owner data on shared cards.

The arrangement described herein is based on the interaction of two actors or entities: the one, called the USER (not by necessity a person), asks for a secure access; the other, called STORAGE MEDIA, has the capability to store user data. While these definitions are general and in no way bound to any specific digital device, a digital memory in the form of a memory card will be primarily referred to in the following as representative of the storage media.

In order to access to the private area, the USER has to allocate it.

Figure 1:
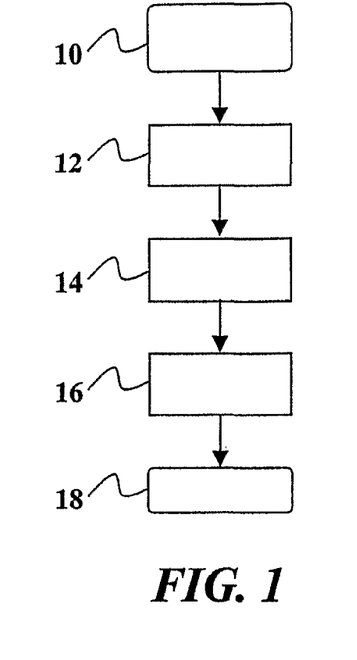
FIG. 1 is an exemplary flow chart of Private Area Allocation within the framework of the arrangement described herein.

As shown in FIG. 1, once started (in a step designated 10 in FIG. 1), the Private Area Allocation Operation is performed by Opening a Session Channel in a step 12 so that a Private Area Allocation can be securely requested in a step 14 (the specific commands used for that purpose will be detailed later). In a step 16 the Session is closed, and in a step 18 the Private Area Allocation Operation ends.

A homologous command flow (not shown) is provided for the de-allocation operation.

Once a Private Area is allocated, the user can access it by a Session Channel and Read/Write commands.

Figure 2:
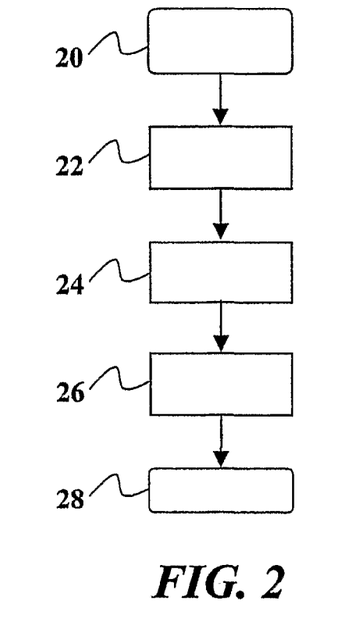
FIG. 2 an exemplary flow chart of Data Transfers within the framework of the arrangement described herein.

FIG. 2 shows the steps involved in performing Read and Write Operations from/to a private area.

Specifically, a Data Transfer Operation, which is started in a step designated 20 in FIG. 2, leads to establishing an Open Session Channel in a step 22. In a step 24 Read/Write Commands are executed, and in a step 26 the Session is closed, while in a step 28 the Read/Write Operation ends. If the session is already open, then the Read/Write Operations can be performed using the current session key. So the Data Transfer Operation designated in FIG. 2 will be reduced to the steps 20, 24, and 28.

Other users cannot generally access the private area thus allocated.

There are however some operations that a privileged USER (named a "Super User") can perform. This is without opening a session but by means of a Super User Personal Identification Number (Super User PIN). Basically the Super User PIN is released at buying time, and the Super User can change it later on. The Super User can moreover indiscriminately delete all the private areas, but it cannot read the corresponding private data.

Figure 3:
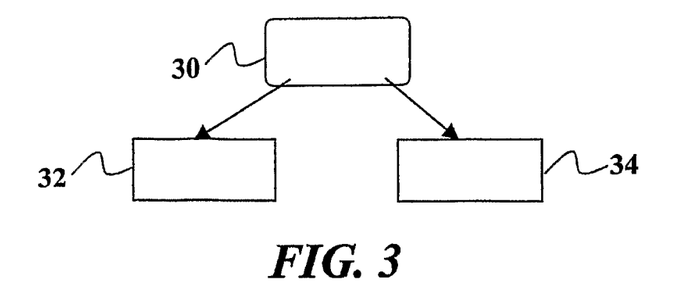
FIG. 3 shows an example of so-called Super User Operations within the framework of the arrangement described herein.

In FIG. 3 some of these operations are schematically shown. Specifically, the set of Super User Operations, designated 30, comprises a Change PIN operation 32 and a Delete User Area operation 34.

Finally, each user (again, without opening any session channel) is entitled to obtain a List of the Users that have already allocated their private areas in the storage media.

Figure 4:
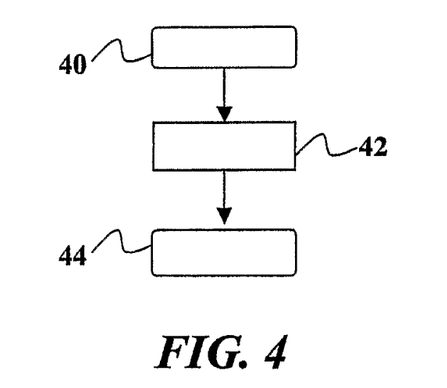
FIG. 4 shows an example of User List Operations within the framework of the arrangement described herein.

This is useful to know the available space on the storage media. FIG. 4 shows a User List flow chart. This starts with an opening step, designated 40. In a step 42 each user can get the User List, and in a step 44 the operation ends.

Preferably, in order to manage communication between the user and the storage media, three logical tables are defined:
Public Keys Table (PKT),
User Allocation Table (UAT),
Session Keys Table (SKT).

The first table contains information about the users. As shown in Table 1, the Public Keys Table is made up of three fields: the User ID; its associated Public Key and its Identification Name. The first time a user allocates a new private area, the card updates this table. When the last area is de-allocated, the card removes the user from the table.

TABLE 1

| User ID | Public Key | User Name |
|---|---|---|
| 1 | A0.12.FA.E6.98 ... | TELECOM ITALIA MOBILE |
| 2 | ... | ... |

Each user communicates its own Public Key by means of a User Certificate. This procedure is well known in Public Key Infrastructure (PKI) based systems, as described for example in Nash, A, "PKI: Implementing and Managing E-Security", chapter 3, 2001 Berkeley (US), Osborne/McGraw-Hill, ISBN: 0-07-213123-3. This object certifies that the Public Key belongs to the user. The Certificate can be released by a Certificatory Corporation. The User ID is assigned by the storage media as reference number to the user, instead of its Public Key because it would be too long (1024 bits typically).

The second table contains information about the Private Memory Areas. As shown in Table 2, the User Allocation Table is made up of three fields: the User ID, the private memory area Starting Block and the Number of Allocated Blocks. This table is updated at allocation and/or de-allocation time.

TABLE 2

| User ID | Starting Block | Blocks Number |
|---|---|---|
| 1 | 0x0 | 0x1000 |
| 2 | ... | ... |

The last table contains information about the session in progress. As shown in Table 3, the Session Keys Table is made up of three fields: the Session ID, the correspondent User ID and the Session Key. This table is updated by the card at session key generation time.

TABLE 3

| Session ID | User ID | Session Key |
|---|---|---|
| 1 | 1 | A4.A3.AF.B9.34.C9 ... |
| 2 | ... | ... |

The session key is generated when a new session is opened by the user.

Figure 5:
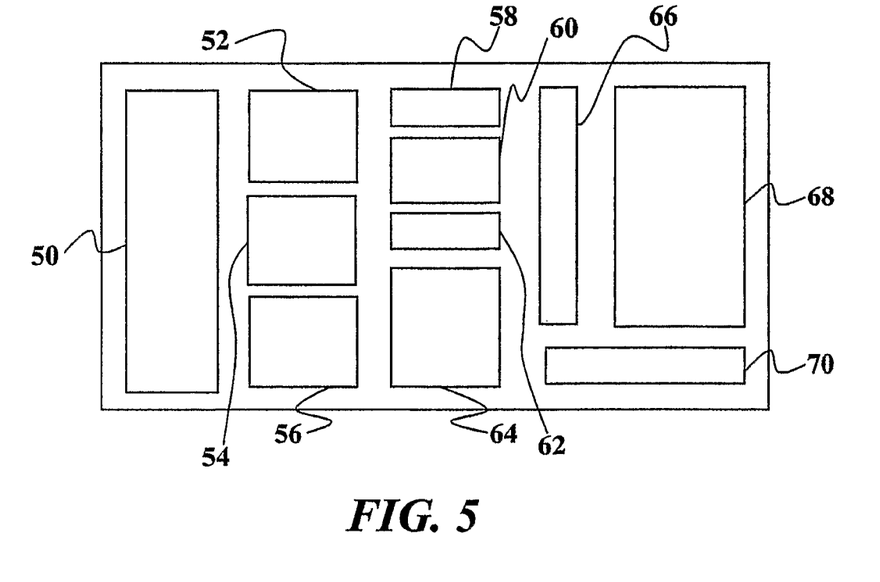
FIG. 5 shows an example of Storage Media Hardware Architecture.

FIG. 5 shows an exemplary hardware architecture of the storage media (e.g. a memory card).

A Card Interface Controller 50 manages the physical communication layer between the card and an external "host" where the card is inserted (e.g. a card reader of any known type).

Three memory areas 52, 54, and 56 (typically in the form of so-called Tamper Resistant Modules or TRMs) store the three tables UAT, PKT, and SKT, i.e. all the information required for a Control Unit 64 to logically manage access to an internal memory 68.

Access to the memory 68 is physically managed by a Hardware Lock 66 (of any known type, e.g. in the form of a switch), that enables/disables the memory control bus.

In order to manage the secure channel between the user and the storage media the following cryptographic modules/functions are included:
- a Random Number Generator 58; this provides a random number to build the session key;
- an Asymmetric Algorithm [A(Key; Data)] engine; this allows encoding data by the private key and decoding them by the correspondent public key, or vice versa;
- a Symmetric Algorithm [S(Key; Data)] engine; this allows encoding data by the same key you have to use to decode them; the two Asymmetric Algorithm/Symmetric Algorithm engines in question are indicated jointly as 60 in FIG. 5; and
- a Hash Algorithm [HMAC(Key; Data)] engine 62; this allows signing data by a key.

The purpose of theses algorithms is well defined on the Public Key Infrastructure system specifications.

A hardware implementation of those functions represents a presently preferred embodiment of the arrangement described. These functions can however be implemented also in software mode.

Finally, a read-only memory area 70 is provided having stored therein a Card Certificate, in order to certify the public key of the card.

A preferred communication protocol for use by the user and the storage media will now be described in details.

Before a user can perform any secure read or secure write operation, a session must be opened. This is done by exchanging the user and the storage media certificates and by generating a session key. The session key is used both for securing the channel between the user and the storage media by encrypting the data, and for signing the commands in order to authenticate the user issuing the command.

In order to perform the secure read/write operations, the user must send a command to the storage media and sign the command using the session key. Any data written to the storage media must be encrypted using the session key. The storage media will use the session key in order to verify the user identity and to decrypt any data received by the user and encrypt any data requested by the user.

In order to increase the communication channel security, two (or more) session keys can be generated at open-session time: the first one to perform the encryption and decryption operations, the second one to verify the user signature. In that case an additional column (containing the second session key) must be added to the Session Key Table.

Such an arrangement is particularly useful in those situations wherein e.g. a SIM-card authenticates the access to the card and a mobile phone (to which the SIM-card is associate performs) the actual ciphering of the communication channel.

There are three classes of operations: Initialization, Data Transfers and Area Allocation.

In order to easily explain the communication protocol, the Application Protocol Data Unit (APDU) is used as reference transport layer. General information on this protocol can be found in the standard ISO/IEC 7816-4.

This protocol essentially includes two command strings: the request strings and answer strings.

Request strings are made up of seven fields:
class of commands,
instruction number,
first parameter,
second parameter, length of data field,
data, and
length of expected answer.

The structure of the Answer strings depends on the previous request command. Usually they are made up of two status fields (where successful or error codes are reported) and some output data, when required.

The Initialization class allows the user and the card (i.e. the media) to authenticate them and to create a session key, which will be used for all secure transfer operations. This class is made up of two instructions: Certificate Exchange and Key Generation.

Figure 6:
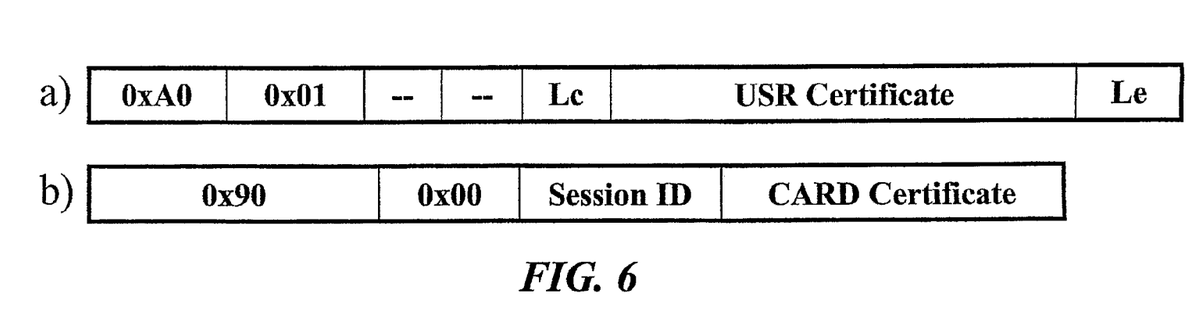
FIG. 6 shows an example of Certificate Exchange Command within the framework of the arrangement described herein.
Figure 7:
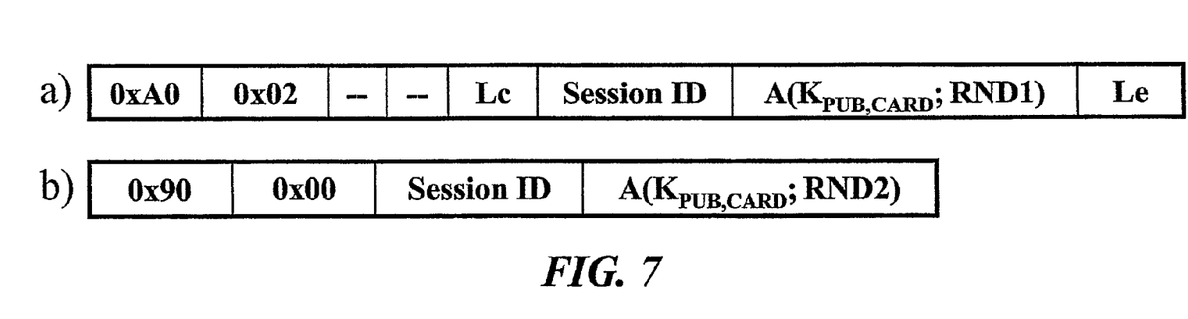
FIG. 7 shows an example of Key Generation Command within the framework of the arrangement described herein.
Figure 8:
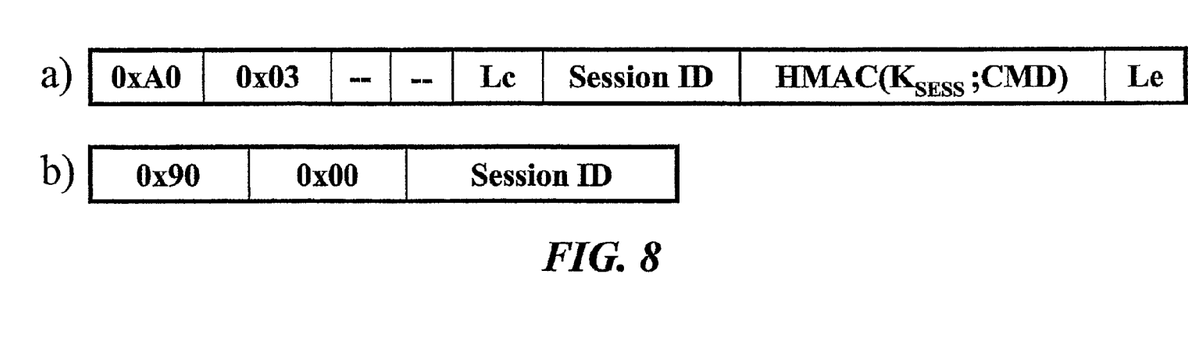
FIG. 8 shows an example of Close Session operation within the framework of the arrangement described herein.

The diagrams in FIGS. 6 to 8 detail this process. Specifically, each of these diagrams includes two superposed portions designated a) and b) which refer to the command sent from the user to the card (portion a) and the answer provided by the card to the user (portion b), respectively. The same also applies to the portions a) and b) of FIGS. 10 to 16.

As shown in FIG. 6, before accessing the card in Data Transfer Mode the user will send the Certificate Exchange command in order to certify its identity. In the first two fields of the request command string, send from user to card, there are specified the class of command and the instruction number. In the data field the User Certificate is write.

This command can be also used to get the card certificate. In this case the USER Certificate field is filled in by zeroes.

After checking the Certificate, the card generates a Session Identifier (SessionID), written in the third field of the answer string, and sends its certificate to the user, which can validate it and accept the SessionID.

FIG. 6 shows just the right answer. If the user certificate is not verified, an answer error code is produced.

In the following explanation of the commands involved, successful answers will be assumed throughout. In general, whenever an error occurs, a specific error answer is generated.

Once the user and the card have certified themselves in turn, the Key Generation command can be issued.

As shown in FIG. 7, the USER sends a random number (RND1) asymmetrically encrypted by the public key of the card, so that only the card can decrypt RND1.

The analogous operation is issued from the card to the user, which receives RND2. The Session Key is a combination of RND1 and RND2 and it is used to protect all data transfers operations. By example, it can be generated as a XOR operation of RND1 and RND2.

The session is time limited so, when it is time to renew the key, the card requests a new key generation procedure by means of the answer status fields.

FIG. 8 shows a Close Session operation performed by using the Session ID and the user signature in order to authenticate the related command.

Figure 9:
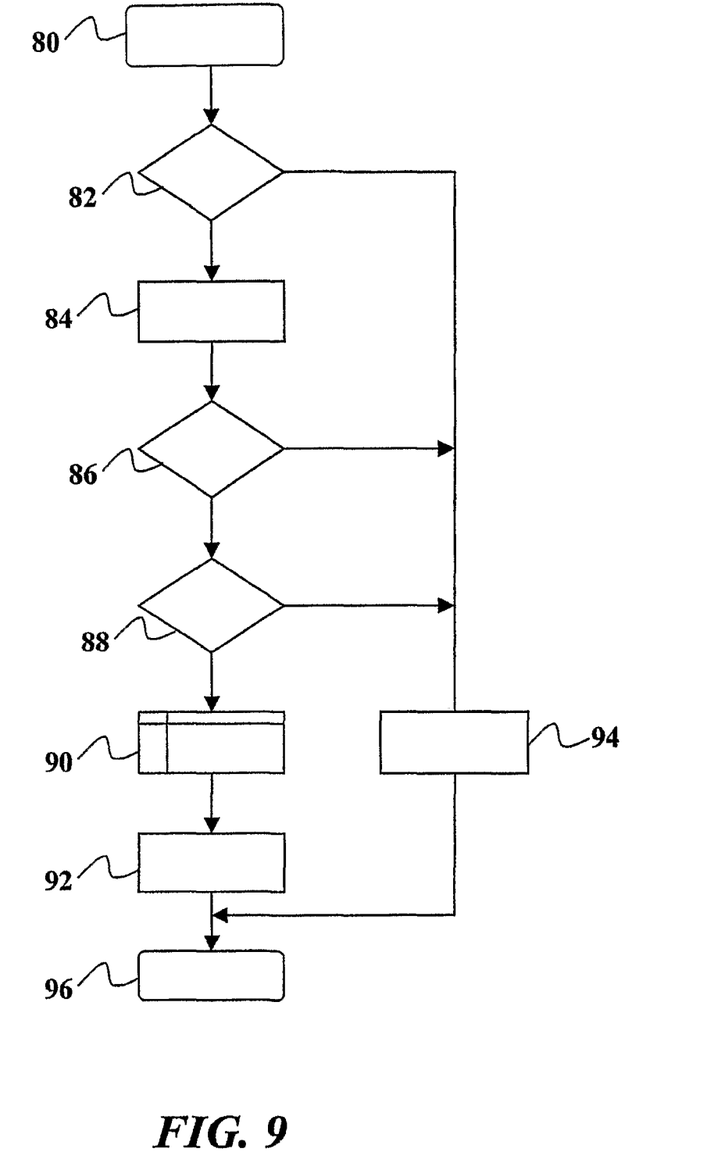
FIG. 9 shows a Flow Chart of an example of Storage Media for Data Transfer commands within the framework of the arrangement described herein.

The Data Transfer class allows the user to issue Read and Write secure commands. FIG. 9 shows a flowchart of the operations performed by the storage media when a Data Transfer command is issued. It is important that a user private area has been allocated by Allocate command before accessing in a secure way the card. The user has been registered within the card, so its private area is already available.

In a step 80 the Secure Multi User Write/Read operation is started. In a step 82 the session is checked. If the session Key Table contains the Session ID the operation continues with a step 84 because the session is already open. If the session Key Table does not contains the Session ID, a Return Error Response step 94 is executed because the session is unknown. In the step 84 the user that opened the session is identified. This operation is performed by simply reading the Session Key Table to automatically know the corresponding USER ID. In a step 86 the address is checked. By the USER ID it is possible to check on the User Allocation Table if the specified address belongs to the USER. In the affirmative case, address range inside User Private Area, the operation continues with a step 88. In negative case, i.e. address range outside User Private Area, a Return Error Response step 94 is executed.

In the step 88 the command signature is checked. The card verifies the signature calculated by the user. The card is in a position to do so as it is knowledgeable of the Session Key via the Session Key Table. If the check fails, a Return Error Response step 94 is executed. If the check is correct the operation continues with a step 90. In the step 90 the command is executed. At this point the card can execute the read/write operation because the previous check (step 88) unlocked, via the hardware lock 66, the memory bus for the specified addresses range. After that, in a step 92 a Successful Response is returned to the user. A step 96 ends the Data Transfer command.

Figure 10:
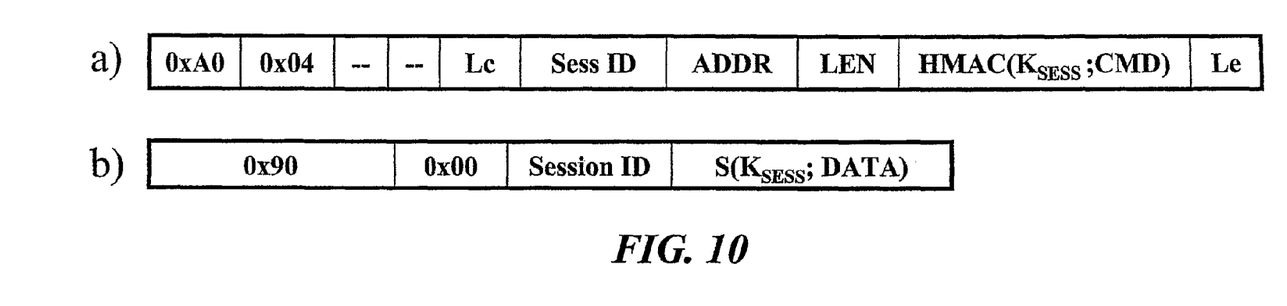
FIG. 10 shows an example of Secure Read Command within the framework of the arrangement described herein.

With reference to FIG. 10, when the user wants to read some private data, it performs a Secure Read command. This command is signed e.g. by the HMAC algorithm. The signature is linked to a valid session, so the card cannot accept un-identified commands. Before sending encrypted data, the card checks the user privileges. Address and Length fields encryption is allowed when the user needs to hide that information. On this subject, the second parameter can indicate the address and length encryption mode.

Figure 11:
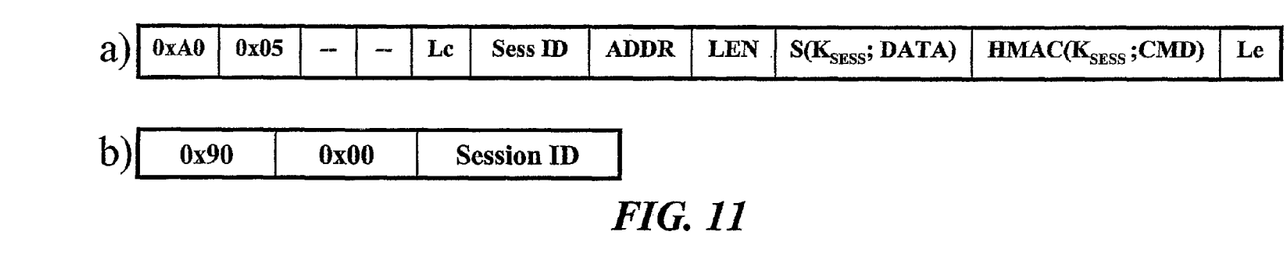
FIG. 11 shows an example of Secure Write Command within the framework of the arrangement described herein.

As shown in FIG. 11, the Secure Write command is basically similar to the Secure Read. The user encrypts data by the session key.

The third class is made up of five commands:
Change SuperUser Pin,
Get User List,
Delete User,
Allocate, and
De-allocate.

This class is intended to manage the private areas within the card. Each user can allocate a new private area and/or de-allocate its own area. In order to guarantee that the card can be de-allocated every time, a SuperUser is defined. Typically, the SuperUser is the card owner and it can decide to de-allocate some or all private areas. The SuperUser can access the card by means of a PIN.

Figure 12:
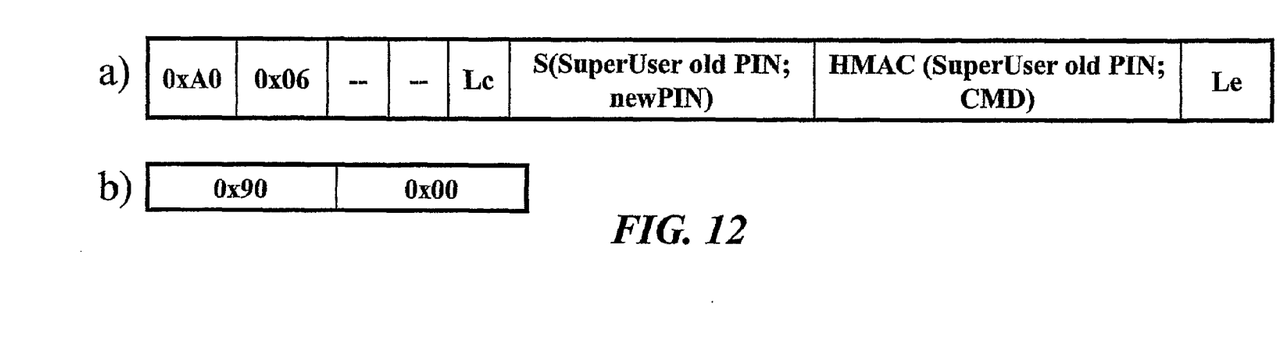
FIG. 12 shows an example of Change SuperUser Pin operation within the framework of the arrangement described herein.

As shown in FIG. 12, the PIN can be changed by the Change SuperUser PIN command. The new PIN is encrypted by the old PIN and signed by the SuperUser, so that the card can verify its identity. At building time a default SuperUser PIN is stored within the card. It will be communicated to the buyer at purchasing time.

Figure 13:
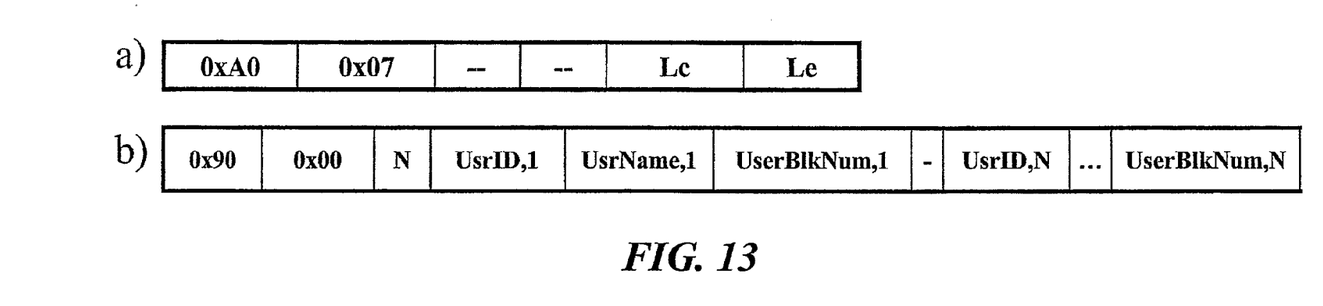
FIG. 13 shows an example of Get User List operation within the framework of the arrangement described herein.
Figure 14:
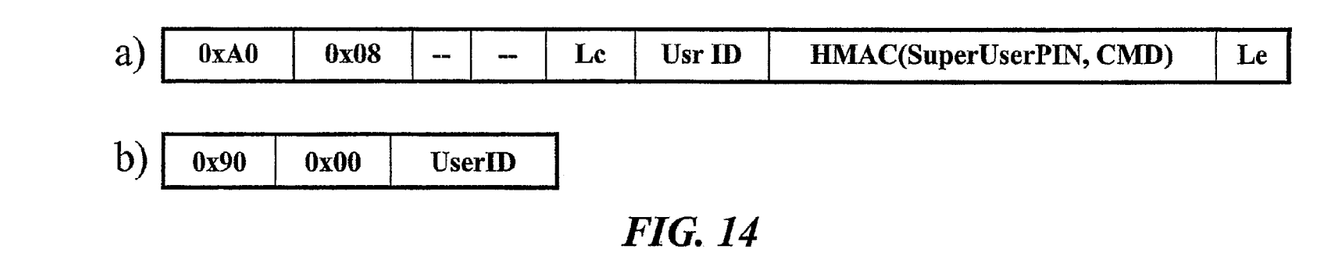
FIG. 14 shows an example of Delete User operation within the framework of the arrangement described herein.

The Get user List can be requested by any user by issuing a corresponding command (as shown in FIG. 13). The list in question is comprised, for each area, of information representative of the User ID, the User Name, the number of memory blocks allocated etc. Only the SuperUser can delete some or all private areas (by means of the command shown in FIG. 14).

The commands above can be issued out of session. The following commands, instead, must be sent by the user during a session. They allow the user to allocate or de-allocate its personal areas.

Figure 15:
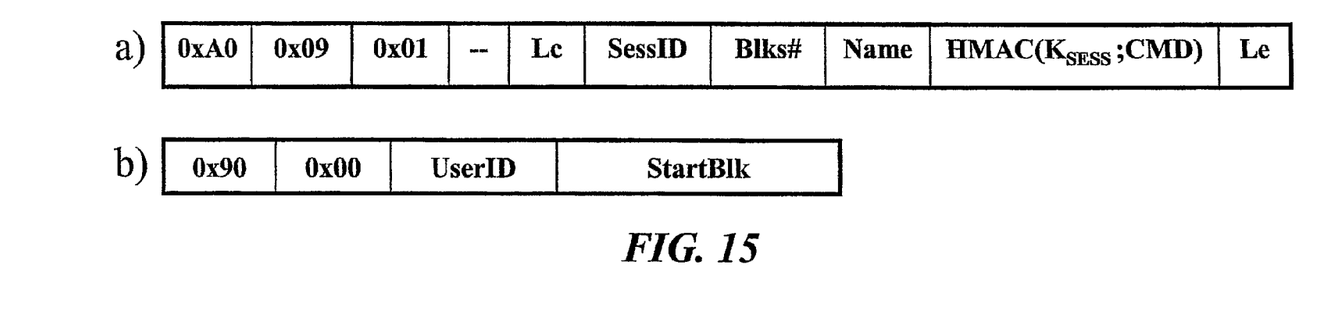
FIG. 15 shows an example of Allocate operation within the framework of the arrangement described herein.
Figure 16:
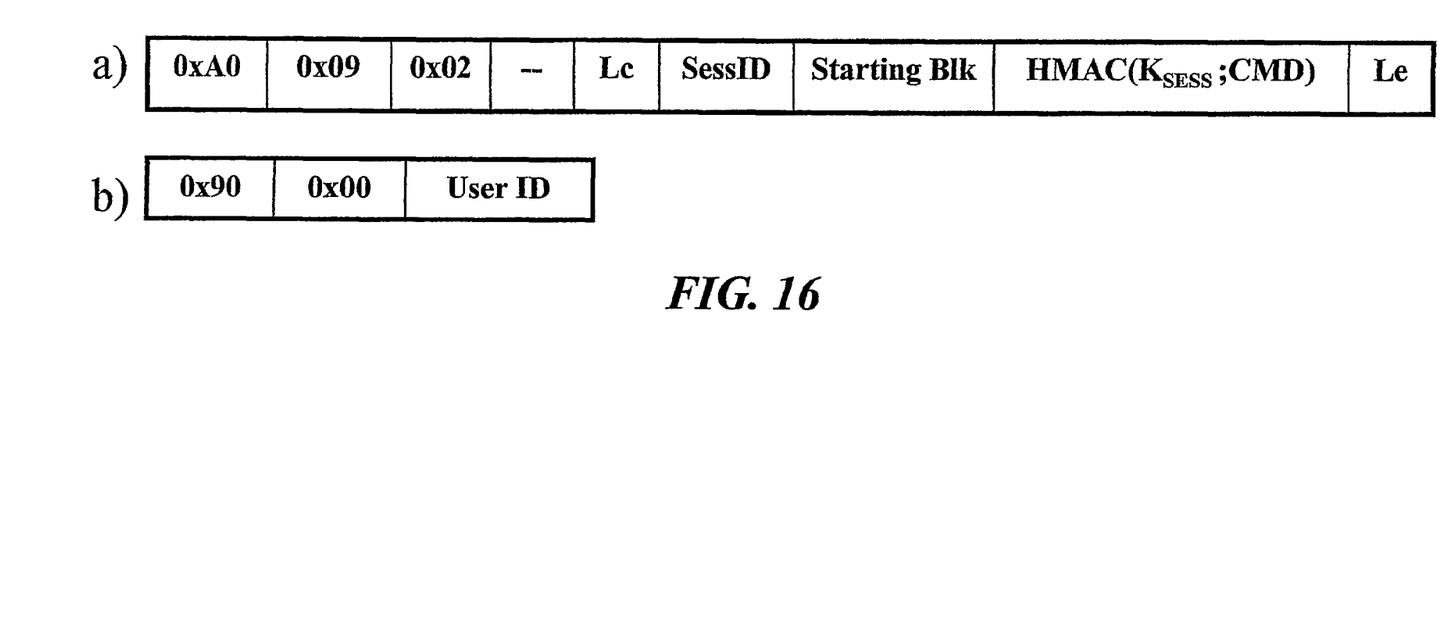
FIG. 16 shows an example of De-allocate operation within the framework of the arrangement described herein.

In particular, the command shown in FIG. 15 allows allocating a private memory area for a number of blocks [Blks Numbr]. The command shown in FIG. 16 allows de-allocating a private memory area starting from a given block [Starting Blk].

The solution described herein can be applied to generic secrets contents. In order to better understand how this is possible, an application example about mobile terminals contents delivery and control is given. The example is split in two actions: contents delivery and contents control.

Mobile Terminal Contents and Services Delivery

Figure 17:
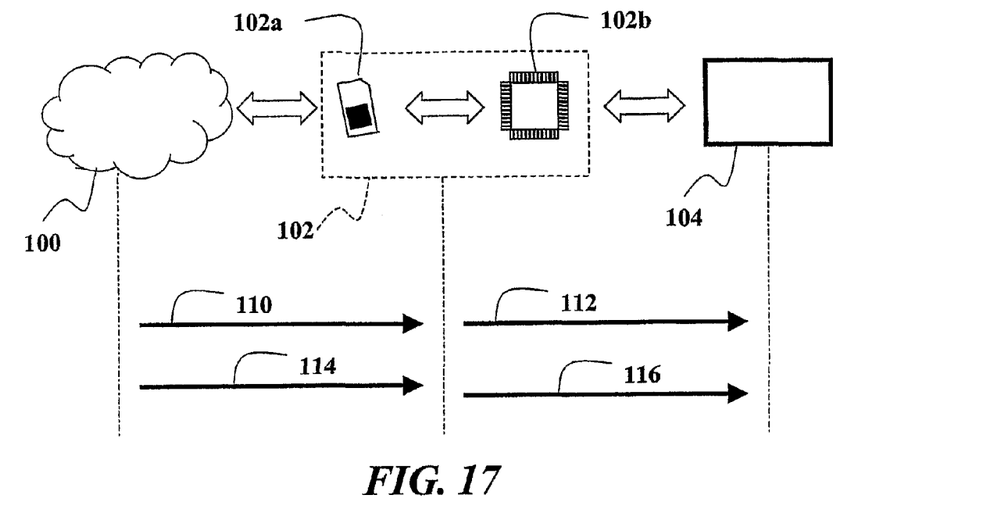
FIG. 17 shows an example of Content and Services Delivery operation within the framework of the arrangement described herein.

By referring to FIG. 17, communication between a network and an associated mobile terminal will be assumed to take place in conventional manner. The description herein will focus on communication between the mobile terminal and the memory cards.

Specifically, the case will be considered of a Contents and Services provider wishing to transfer in a secure manner a given media content (and the related license) to a memory card 14.

In FIG. 17 the main delivery transfer steps are shown.

In FIG. 17 reference 100 designates a Contents and Services Provider. Reference number 102 designates as a whole a Mobile Terminal including a SIM Card 102a and a CPU Processor 102b. Finally, reference 104 designates a Memory Card of the type previously described in connection with FIG. 5.

In a step 110, the Provider 100 sends a string (Content_Header||Enc_Content) to the Mobile Terminal 102. in this context, the symbol "||" represents the concatenation operation. The string in question conveys the description of the content sent and the encrypted content.

In a step 112, the Mobile Terminal 102 writes a string (Content_Header||Enc_Content) into the Memory Card 104.

The Contents and the Services Provider 100 sends, in a step 114, the string (Enc_License), i.e. a respective license, to the Mobile Terminal 102.

The Mobile Terminal 102 writes, in a secure step 116, the string ($K_{SIM,symm}$; Enc_License) into the Secure Multi User Memory Card 104.

A Random key ($K_{CONT,symm}$) is generated by the Content Provider 100. The content is then ciphered by means of a symmetric encryption algorithm:

$$\text{Enc\_Content} = S(K_{CONT,symm}; \text{Cont})$$

The license contains $K_{CONT,symm}$, Content Certificate and DRM information. It is linked to the user by the SIM and ciphered by an asymmetric algorithm:

$$\text{Enc\_License} = A(K_{SIM,pub}; \text{License})$$

$K_{SIM}$ and $K_{CONT}$ designate respective encryption keys for the SIM-card and for the content, respectively. The SIM-card has three associated keys namely $K_{SIM,symm}$ (a symmetric key) plus two asymmetric keys $K_{SIM,priv}$ and $K_{SIM,pub}$ that are a private key and a public key, respectively.

Mobile Terminal Contents and Services Control

The Mobile Terminal derives the encrypted content and the associated license name from the content header. Only the SIM-card can read the encrypted license using the key $K_{SIM,symm}$. The SIM-card decrypts the license using the key $K_{SIM,priv}$, checks it and sends the content key $K_{CONT,symm}$ to the CPU. The SIM-card updates the license and writes it to the card. Only the SIM-card can do it. Finally the CPU decrypts the content using the $K_{CONT,symm}$ to execute the application.

Figure 18:
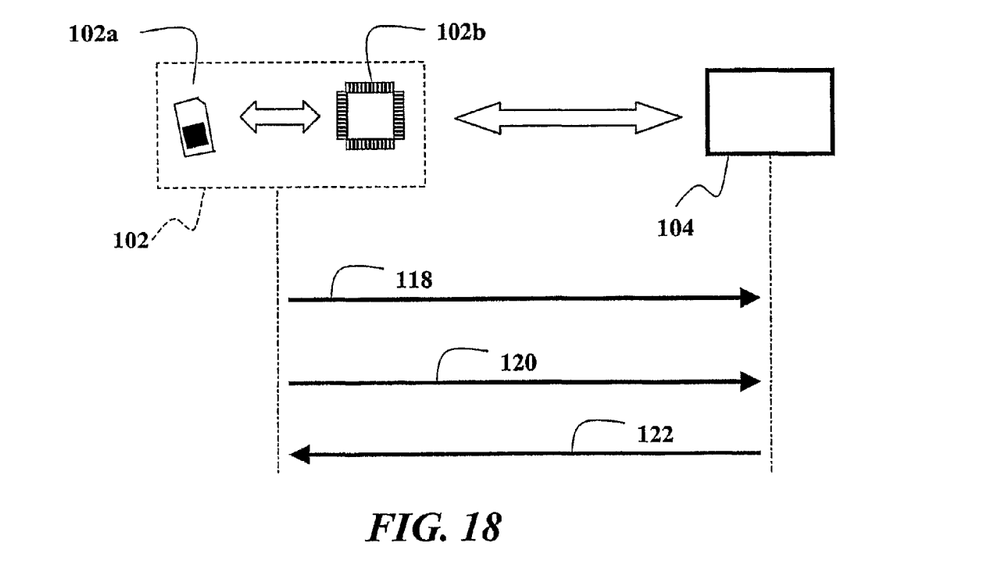
FIG. 18 shows an example of Contents and Services Control operation within the framework of the arrangement described herein.

In FIG. 18, in a step 118, the Mobile Terminal 102 reads from the Memory Card 104 the string (Content_Header||Enc_Content).

Additionally, in a step 120 the Mobile Terminal 102 reads from the Memory Card 104 the string (Enc_License) whereby the Mobile Terminal 102 is able to decrypt and read the license.

Finally, in a step 122, the Mobile Terminal 102 sends back to the Memory Card 104 a string (Enc_New_License) containing the license encrypted by using the key $K_{SIM,symm}$.

It will thus be appreciated that the foregoing is a detailed description of an arrangement for controlling access by a plurality of users to a digital memory and protecting data in said digital memory. The arrangement in question provides for a digital memory such as a memory card being dynamically partitioned in private areas for storing data, these private areas being securely allocated to respective users of said plurality. The users are then permitted to access said respective private areas, once allocated, via a secure session channel to perform read/write commands in said respective area allocated. In a particularly preferred embodiment of the invention the users are in position to self-allocate respective private areas in the digital memory.

Without prejudice to the underlying principles of the invention, the details and the embodiments may vary, also appreciably, with reference to what has been described by way of example only, without departing from the scope of the invention as defined by the annexed claims.

The invention claimed is:

1. A method of controlling access by a plurality of users to a digital memory accessible by a plurality of users, and protecting data in said digital memory, the method comprising:
   generating a list of users that have allocated private areas in said digital memory;
   making said list available to users in said plurality without opening a session;
   receiving a request for self-allocation from at least one of said users in said plurality for a first private area in said digital memory;
   allocating by said digital memory said first private area of a plurality of private areas for storing data in said digital memory in response to said request for self-allocation of a private area by at least one of said users in said plurality, said users in said plurality being an individual or a service provider which securely requested allocation of respective private areas in said digital memory;
   opening a secure session channel for said first private area, whereby allocation of said respective private areas in said digital memory can be securely requested; and
   permitting said at least one of said users in said plurality access to said first private area via said secure session channel to perform read/write commands; and
   allowing at least one privileged user to perform a predetermined set of operations in said respective private areas allocated in said digital memory via a privileged personal identification number without opening a session.

2. The method of claim 1, comprising the step of preventing users in said plurality from accessing data stored in respective private areas allocated to other users in said plurality.

3. The method of claim 2, wherein said predetermined set of operations comprises at least one of deleting respective private areas allocated in said digital memory and changing said privileged personal identification number.

4. The method of claim 1, comprising the step of managing communication between said users in said plurality and said digital memory by means of a cryptographic key mechanism.

5. The method of claim 4, comprising the step of managing communication between said users in said plurality and said digital memory by means of a public key infrastructure.

6. The method of claim 5, comprising the step of said users in said plurality communicating respective public keys by means of a user certificate.

7. The method of claim 1, comprising the step of having respective user IDs assigned to said users in said plurality by said digital memory.

8. The method of claim 1, comprising the steps of:
before permitting said at least one of said users in said plurality to perform said read/write commands, opening a session by generating at least one session key using at least one of:
providing a secure channel between said at least one of said users in said plurality and said digital memory by encrypting the data exchanged over said secure channel, and
signing said commands in order to authenticate said at least one of said users in said plurality issuing said read/write commands.

9. A digital memory being accessible by a plurality of users and comprising protected data stored therein, said digital memory further comprising:
a first private area of a plurality of private areas allocated by said digital memory to at least one of said plurality of users in response to a request by said at least one of said plurality of users for self-allocation of a private area of said digital memory; and
a secrecy tool configured for securely allocating respective private memory areas to said users in said plurality by opening a secure session channel, whereby allocation of said respective private areas in said digital memory can be securely requested, said users in said plurality being an individual or a service provider;
a control unit permitting said at least one of said users in said plurality to access said first private area via said secure session channel to perform read/write commands in said first private area, and allowing at least one privileged user to perform a predetermined set of operations in said respective private areas allocated in said digital memory via a privileged personal identification number without opening a session,
wherein said memory is configured for generating a list of the users that have allocated private areas in said digital memory and for making said list available to users in said plurality without opening a session.

10. The memory of claim 9, comprising a lock module configured for preventing users in said plurality from accessing data stored in respective private areas allocated to other users in said plurality.

11. The memory of claim 9, wherein said secrecy tool comprises at least one cryptographic algorithm engine for managing communication between said users in said plurality and said digital memory by means of a cryptographic key mechanism.

12. The memory of claim 11, wherein said at least one cryptographic algorithm engine is configured for implementing a public key infrastructure.

13. The memory of claim 12, comprising a set of memory areas for managing communication between said users in said plurality and said digital memory, said set comprising memory areas storing at least one of:
a public keys table containing information about the users,
a user allocation table containing information about the private memory areas, and
a session keys table containing information about sessions in progress.

14. The memory of claim 13, wherein said public keys table comprises information items as to:
a user ID,
an associated public key, and
an associated identification name.

15. The memory of claim 13, wherein said user allocation table comprises information items as to:
user IDs,
the starting blocks of said respective private areas allocated in said digital memory, and
the number of allocated blocks in said respective private areas allocated in said digital memory.

16. The memory of claim 13, wherein said session keys table comprises information items as to:
a session ID,
the correspondent user ID, and
a session key.

17. The memory of claim 9, wherein said secrecy tool is configured for:
before permitting said at least one of said users in said plurality to perform said read/write commands, opening a session by generating at least one session key using at least one of:
providing said secure channel between said at least one of said users in said plurality and said digital memory by encrypting the data exchanged over said channel, and
signing said commands in order to authenticate said users in said plurality issuing said commands.

18. The memory of claim 9, comprising a card interface controller for managing a physical communication layer between the digital memory and external host equipment for the digital memory.

19. The memory of claim 9, comprising an internal memory having associated therewith a hardware lock to control access to said internal memory.

20. The memory of claim 9, wherein said secrecy tool comprises a set of cryptographic modules selected from:
a random number generator for providing a random number to build a session key;
an asymmetric algorithm engine for encoding data by a private key and decoding them by a correspondent public key or vice versa;
a symmetric algorithm engine for encoding data by a same key used to decode said data; and
a hash module for signing data by a key.

21. The memory of claim 9, comprising a memory certificate for certifying a public key associated with said digital memory.

22. The digital memory of claim 9, comprising a memory card.

23. The digital memory of claim 9, comprising a memory card for being hosted by mobile communication equipment.

24. A non-transitory computer-readable storage medium encoded with a computer program product, stored in the memory of at least one computer and comprising software code portions for performing a method comprising:
generating a list of the users that have allocated private areas in said digital memory;
making said list available to users in said plurality without opening a session;
receiving a request for self-allocation from at least one of said users in said plurality for a first private area in said digital memory;
allocating by said digital memory said first private area of a plurality of private areas for storing data in said digital memory in response to said request for self-allocation of a private area by at least one of said users in said plurality, said users in said plurality being an individual or a service provider which securely requested allocation of respective private areas in said digital memory;

opening a secure session channel for said first private area, whereby allocation of said respective private areas in said digital memory can be securely requested; and permitting said at least one of said users in said plurality access to said first private area via said secure session channel to perform read/write commands; and allowing at least one privileged user to perform a predetermined set of operations in said respective private areas allocated in said digital memory via a privileged personal identification number without opening a session.

* * * * *